(12) United States Patent
Gretz

(10) Patent No.: US 6,194,661 B1
(45) Date of Patent: Feb. 27, 2001

(54) DUPLEX CONNECTOR

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/373,427

(22) Filed: Aug. 13, 1999

(51) Int. Cl.$^7$ ....................................................... H02G 3/18
(52) U.S. Cl. ..................... 174/65 R; 439/552; 174/153 R
(58) Field of Search ............................... 439/552; 174/59, 174/60, 61, 62, 151, 65 R, 65 G, 153 R, 153 G

(56) References Cited

U.S. PATENT DOCUMENTS 5,373,106 * 12/1994 O'Neil et al. ...................... 174/65 R

* cited by examiner

Primary Examiner—Neil Abrams
Assistant Examiner—Javaid Nasri

(57) ABSTRACT

A duplex electrical connector having a housing and an insert in the housing that provides two inbound end apertures that conduct two armored cables to and through a single outbound end aperture. The duplex electrical connector incorporates snap in spring steel retainers to provide a connector that allows rapid and simplified installation of a pair of armored cables into a single junction box outlet. The outbound end of the duplex connector preferably has a smooth outer cylindrical section and includes an outer diameter with flanges that accommodates a spring steel snap in adapter for retention of the duplex connector in a junction box. The two inbound apertures each include a spring steel retainer having outwardly extending tangs that hold it in the inbound aperture and inwardly extending tangs that retain an inserted cable and resist retraction thereof from the duplex connector. The inwardly extending tangs are oriented to guide an inserted armored cable toward the single outbound end of the duplex connector.

10 Claims, 2 Drawing Sheets

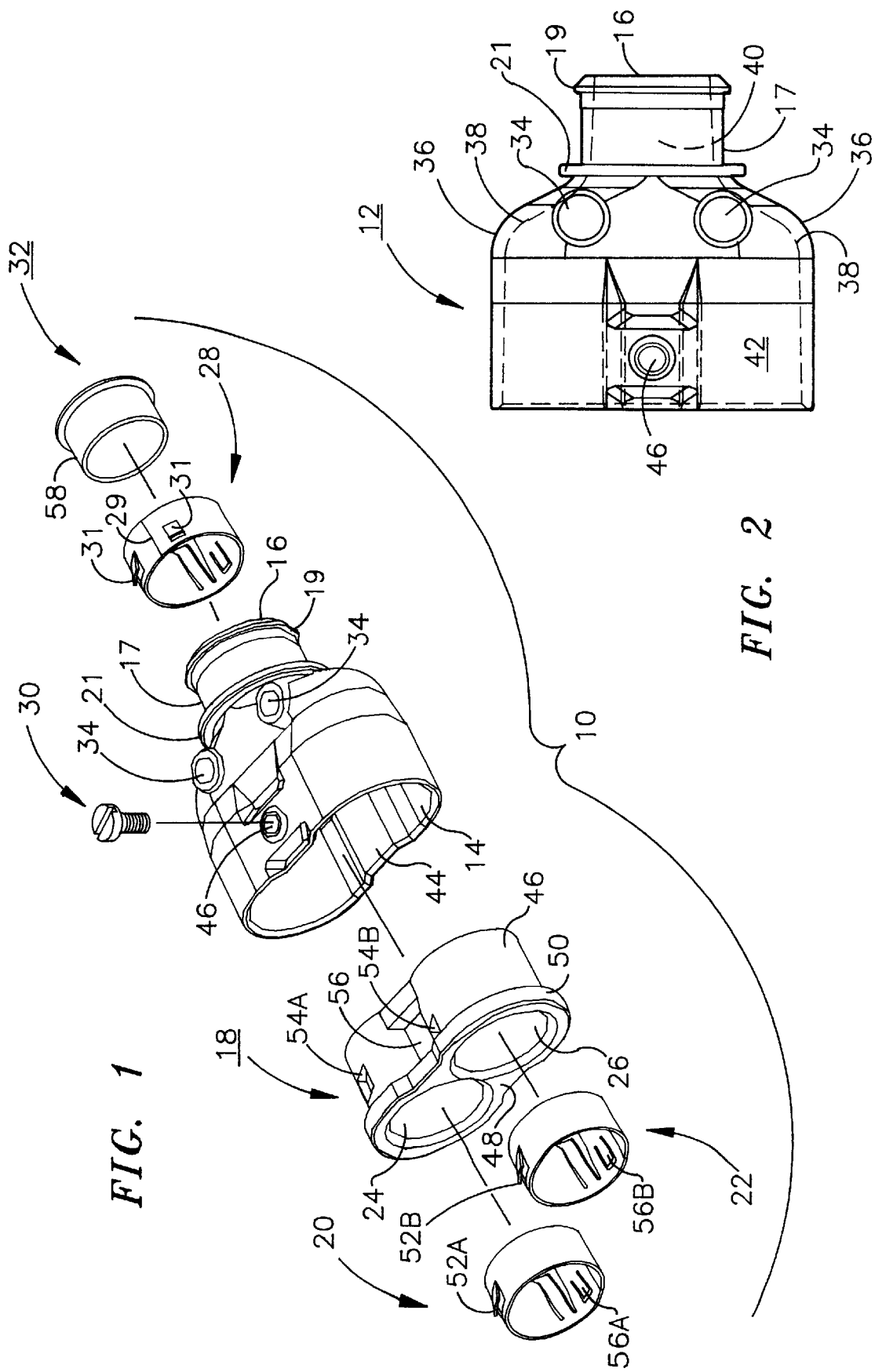

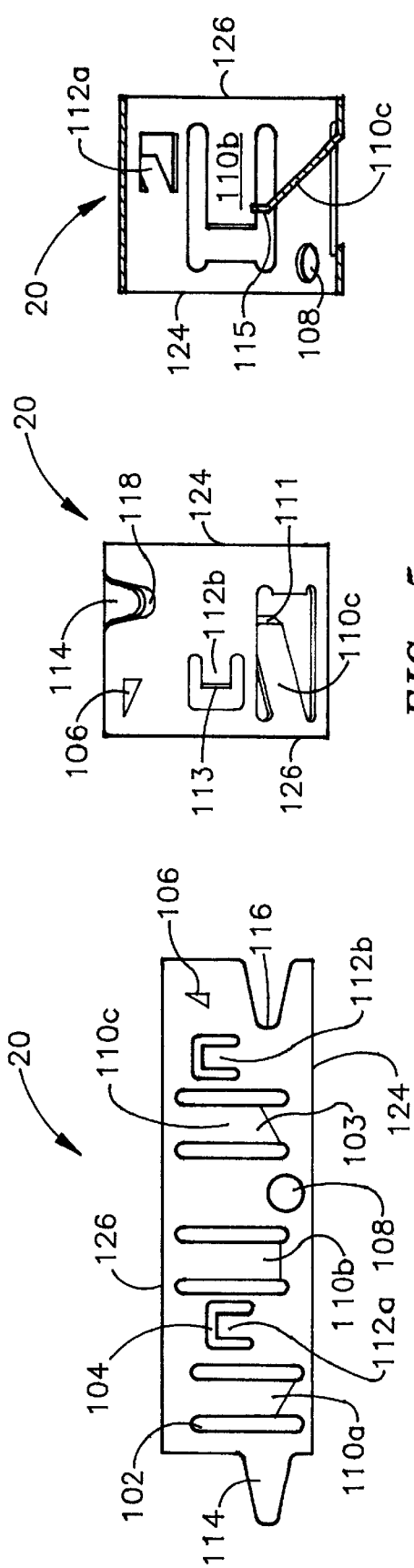

DUPLEX CONNECTOR

FIELD OF THE INVENTION

The present invention relates to cable terminations and more particularly to duplex or two-wire cable terminations that snap into place and include snap-on cable retainers, neither of which requires twisting for locking.

BACKGROUND OF THE INVENTION

U.S. patent application Ser. No. 09/007,532 filed Jan. 15, 1998 in the name of Thomas J. Gretz for, "Snap in Cable Connector" describes a locking cable connector composed of three mating pieces that snap together and provide a connector for helically wound armored or metal clad electrical conductors. A spring steel adapter is used in conjunction with an electrical junction box to fix the location of the locking cable connector with respect to the junction box. The first piece of the snap in locking cable connector is a die cast member including at its inbound end a smooth outer cylindrical section having an outer diameter with flanges that accommodates a spring steel adapter. The second piece is a spring steel locking ring provided to receive a helically wound shielded cable that is inserted into the out end of the die cast member. The locking ring has outwardly directed tangs that allow insertion into the die cast member but restrict withdrawal thereof from the die cast member. The locking ring also has oppositely or outwardly directed tangs to receive the armored cable and to restrict its movement in the opposite or withdrawal direction.

The spring steel locking ring has a cut out section that permits slight compression so that the locking ring may be easily inserted into the die cast member. Once inserted, the locking ring is able to expand to the full inner diameter of the die cast member to provide a tight and secure fit.

SUMMARY OF THE INVENTION

The present invention provides a duplex connector comprising a housing and an insert in the housing that provides two inbound end apertures that conduct two armored cables to and through a single outbound end aperture. The inbound end apertures incorporate the snap in spring steel retainers of U.S. patent application Ser. No. 09/007,532 to provide a connector that allows rapid and simplified installation of a pair of armored cables into a single junction box outlet. The outbound end of the duplex connector of the present invention preferably has a smooth outer cylindrical section and includes an outer diameter with flanges that accommodates a spring steel snap-in adapter for retention of the duplex connector in a junction box. The two inbound apertures each include a spring steel retainer having outwardly extending tangs that hold it in the inbound aperture and inwardly extending tangs that retain an inserted cable and resist retraction thereof from the duplex connector. According to a preferred embodiment of the present invention, the inwardly extending tangs are oriented to guide an inserted armored cable toward the single outbound end of the duplex connector.

DESCRIPTION OF THE DRAWINGS

FIG. 1 is a blown apart view of the duplex connector of the present invention.

FIG. 2 is a top view of the duplex connector of the present invention.

FIG. 3 is a plan view of a die-cut blank that is formed into the preferred spring steel retainer of the present invention.

FIG. 4 is an end view of the preferred spring steel retainer of the present invention.

FIG. 5 is a top view of the spring steel retainer of FIG. 4.

FIG. 6 is a side view of the spring steel retainer of FIG. 4.

FIG. 7 is a cross-sectional view of the spring steel retainer of FIG. 4 along the line 7—7 of FIG. 4.

FIG. 8 is an end view of the spring steel retainer of FIG. 4.

DETAILED DESCRIPTION OF THE INVENTION

As shown in the drawings and particularly FIGS. 1 and 2, the duplex connector 10 of the present invention comprises: a housing 12 having a generally oval or race track-shaped inbound end 14 and a cylindrical outbound end 16; an inbound end insert 18; spring steel cable retainers 20 and 22 that insert into inbound insert apertures 24 and 26; spring steel locking ring 28 about the outer diameter 17 cylindrical outbound end 16 and retained by flanges 19 and 21; and locking screw 30. According to a preferred embodiment, of the present invention a bushing 32 is inserted into outbound end 16. A further preferred embodiment of the present invention includes a pair of peepholes 34 that permit viewing of the interior of housing 12 to determine the presence and/or location of cable inserted into housing 12 through insert apertures 24 and 26.

Housing 12, in addition to previously described generally oval inbound end 14, peepholes 34, and cylindrical out bound end 16 incorporating outer diameter 17 and flanges 19 and 21 includes shoulder portions 36 whose interior surfaces 38 are smooth to guide cables inserted through inbound end 14 via insert apertures 24 and 26 toward and through internal volume 40 of cylindrical outbound end 16. Additionally, housing 12 includes, in at least one of its relatively flat top or bottom walls 42 and 44, a threaded hole 46 for rotational engagement of screw 30 as described hereinafter. Flange 19 has a slight inward incline to ease insertion of housing 12 into a junction box aperture and to ease the application of spring steel adapter over outer diameter 17. Flange 21 is of a greater diameter than flange 19 to prevent over insertion of spring steel adapter 28.

The various other shapes and features of housing 12 depicted in the drawings are largely matters of functional design, material minimization and manufacturability and do not materially affect the functionality of housing 12.

Insert 18 comprises a binocular shape and has outer dimensions at insertion end 46 that are matched to the inner dimensions of generally oval inbound end 14 of housing 12. End 48 of insert 18 includes a flange 50 about both insert apertures 24 and 26 that serves as a stop to limit insertion of insert 18 into inbound end 14 of housing 12.

Spring steel cable retainers 22 and 24 are inserted into apertures 24 and 26 with tangs 52A and 52B engaging openings 54A and 54B in insert 18. A complimentary set of tangs 56A and 56B engage matching openings opposite openings 54A and 54B in insert 18 (not shown).

FIG. 3 is a plan view of the die-cut blank 100 that is formed into spring steel cable retainers 20 and 22. A plurality of lateral slots 102 is formed in pairs along blank 100. Adjacent pairs of lateral slots 102 are joined by cuts 103 extending between them. U-shaped cutouts 104 are also formed in blank 100. Blank 100 has a forward edge 124 which is positioned toward the inside of apertures 24 and 26 when installed in insert 18 and a trailing edge 126 that faces toward the outside of apertures 24 and 26 when installed in insert 18. Both the lateral slots 102 and U-shaped cutouts 104 are positioned at staggered distances from forward edge 124. Blank 100 also includes a triangular cut 106 positioned near trailing edge 126 and an aperture 108 that is used to hold blank 100 during the manufacturing process when blank 100 is formed into tubular spring steel retainers 24 and 26. When blank 100 is formed into its tubular shape, tongue 114 partially enters groove 116 formed on the opposite end of blank 100. Lateral slots 102 and cuts 103 define staggered tangs 110A, 110B and 110C that are positioned at varying precalculated distances from forward edge 124.

FIG. 4 is an end view of spring steel retainers 20 or 22 from trailing edge 126 after blank 100 has been formed into its tubular shape. A gap 118 remains between the two ends of retainer 20 or 22 where tongue 114 approaches but does not contact groove 116. The purpose of gap 118 is to impart a collapsible action to spring steel retainer 20 or 22 so that slight pressure on the outer periphery thereof will collapse it thereby allowing it to enter apertures 24 and 26 and interact with openings 54A and 54B in apertures 24 and 26 when inserted therein.

FIG. 4 depicts the orientation of staggered tangs 110A, 110B and 110C outward projecting tangs 112A and 112B and triangle shaped gripper 122 on tubular shaped retainer 20 or 22. Outward projecting tangs 112A and 112B are defined by U-shaped cutouts 104 and are positioned essentially 180° apart on the outer periphery of spring steel retainer 20 or 22 to provide stability when inserted into insert 18 as shown in FIG. 1. It should be noted that tangs 112A and 112B have angled outward surfaces and relatively flat axial surfaces since the force that needs to be exerted on insert 18 is in direct line with the direction of insertion and removal. Tangs 112A and 112B allow insertion of spring steel retainers 20 and 22 into apertures 24 and 26 while restricting withdrawal of spring steel retainer 20 or 22 from insert 18. An alternative arrangement (not shown) could include three tangs spaced even about the periphery of spring steel retainer 20 or 22 or even four tangs similarly equally spaced, providing an adequate and equal number of apertures 54 were provided in insert 18.

FIG. 5 is a top view of spring steel retainer 24 or 26. The edge 111 of staggered tangs (110C depicted) that will serve to engage an inserted cable (not shown) are oriented toward forward edge 124 that is oriented as described above. By being oriented toward forward edge 124, edges 111 of staggered cable tangs (110C depicted) are able to grip and hold an armored cable (not shown) that is subsequently inserted from the direction of trailing edge 126. Conversely, outward projecting tangs (112B depicted) will be oriented with edges 113 toward trailing edge 126 thereby resisting removal of spring steel retainer 20 or 22 from aperture 54 and consequently insert 18. An alternative embodiment might include the use of only a pair of tangs, 110A and 110C oriented 180° one from another with the elimination entirely of tang 110B. While not as desirable from several standpoints, namely less restraining force against removal of an inserted cable, and less directional force guiding an inserted cable toward the center of housing 12 as described below, such an arrangement would provide an adequate structure and is clearly contemplated as within the scope of the appended claims.

The surfaces of tangs 110A and 110C have a relatively flat axial surface with tangs 110A and 110C angled inwardly toward the inner end of insert 18. Tangs 112A and 112B and 110A, 110B and 110C are lanced from the cylindrical wall of spring steel retainer 20 or 22. The inside ends (111 depicted in FIG. 5) are bent in a radial direction and jagged with points since the force that needs to be exerted upon insertion of an armored cable is helical or twisting in nature and a flat surface would simply slide along the groove of such an armored cable thereby lessening the restraining force of tangs 110A and 110C. Tang 110B may be flat and not bent in, so long as tangs 110A and 110C serve to appropriately guide the armored cable over tang 110B so that it may contribute to the required retraining force that pushes an inserted cable toward the "untangled" wall of spring steel retainer 20 or 22 thereby providing an area between tangs 110A, 110B and 110C and the interior wall of spring steel retainer 20 or 22 that is less than the diameter of the inserted cable.

FIG. 6 is a side view of spring steel retainer 20 or 22 of FIG. 4. A shown in this Figure, outward projecting tangs 112A and 112B are at staggered distances from trailing edge 126. Two staggered cable tangs 110B and 110C are depicted at staggered distances from forward edge 124.

FIG. 7 is a cross-sectional view of spring steel retainer 20 or 22 taken along line 7—7 of FIG. 4. Staggered cable tang 110C is depicted extending inwardly into tubular shaped spring steel retainer 20 or 22. An angled end 115 is shown near the end of staggered cable tang 110C.

FIG. 8 is an end view of spring steel retainer 20 or 24 as viewed from forward edge 124 showing staggered cable tangs 110A, 110B and 110C oriented toward forward edge 124.

It is important to the most successful practice of the present invention that spring steel retainers 20 and 24 be oriented within apertures 24 and 26 such that tangs 110A, 110B and 110C are oriented and depicted in FIG. 1, i.e. that their orientation is such as to server to guide cable inserted therein toward the center of housing 12. Such an orientation of spring steel cable retainers 20 and 22 simplifies the insertion of a pair of cables through hosing 12 by prepositioning the cables toward the center of housing 12 as they are inserted thereby making the task of pushing them through cylindrical volume 40 much easier.

Spring steel adapter 28 includes a slot 29 to permit expansion prior to being fitted over diameter 17, and includes a plurality of tangs 31 to prevent removal of adapter 14 from the aperture of a junction box (not shown) after installation into such an aperture. A more detailed description of adapter 14 and its operation can be found in U.S. Pat. No. 5,373,106 entitled' "Quick Connect Fitting for Electrical Junction Box", assigned to the same assignee as the present invention and incorporated herein by reference.

Peepholes 34 are provided in housing 12 to permit viewing of cable location within housing 12 during and subsequent to cable installation.

According to a highly preferred embodiment of the present invention, a bushing 32 comprising a cylindrical body 58 having a flange 60 at its outbound end is inserted to prevent accidental damage to inserted cable. Bushing 32 is designed to frictionally engage the interior of cylindrical outbound end 16 of housing 12 and is preferably made of a polymeric material that serves to cushion cable inserted into housing 12 and exiting therefrom through cylindrical outbound end 16.

Assembly of duplex connector 10 is achieved by insertion of spring steel cable retainers 20 and 22 into apertures 24 and 26 of insert 18 such that tabs 52A and 52B engage openings 54A and 54B and their opposing counterparts (not shown) achieve similar engagement. Insert 18 is then inserted into inbound end 14 of housing 12 until fully seated.

Screw 30 is then tightened into threaded hole 46 and engages surface 56 to retain insert 18 in housing 12. Spring steel adapter 28 is then applied over flange 19 and around outer diameter 17.

While duplex connector 10 can be fabricated from a variety of materials including metals and polymeric materials, it is preferred that it be fabricated as a die cast assembly with housing 12 and insert 18 both being die cast from a suitable metallic alloy. The other elements of duplex connector 10 will of course be fabricated from the materials indicated hereinabove.

As the invention has been described, it will be apparent to those skilled in the art that the same may be varied in many ways without departing from the spirit and scope of the invention. Any and all such modifications are intended to be included within the scope of the appended claims.

What is claimed is:

1. A duplex electrical connector comprising:
   (a) a housing having a cylindrical outbound end and a generally oval inbound end; and
   (b) a generally oval insert in said generally oval inbound end and comprising a pair of parallel cylindrical apertures having inbound and outbound sides; each of said apertures including a tubular spring steel retainer adapted to receive an armored cable and lock said armored cable into said housing, each said tubular spring steel retainer having a first set of outwardly extending tangs that permits insertion of said tubular spring steel retainer into said aperture and by engaging said cylindrical aperture restricting withdrawal of said tubular spring steel retainer from said aperture, and a set of inwardly extending tangs to receive and engage an armored cable having grooves inserted from said inbound side and restrict its removal from said tubular spring steel retainer from said inbound side.

2. The duplex electrical connector of claim 1 including a smooth internal transition zone between said cylindrical outbound end and said generally oval inbound end.

3. The duplex electrical connector of claim 2 further including a tubular spring steel adapter having outwardly extending tangs and capable of engaging an aperture in an electrical junction box with said tangs, about said cylindrical outbound end and flanges on said cylindrical outbound end to retain said tubular spring steel adapter on said cylindrical outbound end.

4. The duplex electrical connector of claim 2 wherein said set of outwardly extending tangs comprises a pair of tangs spaced at 180° from one another on said spring steel retainer.

5. The duplex electrical connector of claim 2 wherein said set of inwardly extending tangs comprises a pair of tangs spaced apart 120° and oriented to direct an inserted cable toward the center of said generally oval shaped inbound end.

6. The duplex electrical connector of claim 2 wherein said set of inwardly extending tangs comprises three tangs, two of said tangs having triangular tips and a third tang that has a square tip, that engage said grooves of an inserted armored cable with said tangs having triangular tips spaced apart on either side of said third tang that has a square tip, said three tangs being oriented so as to force as an inserted cable toward the center of said housing.

7. The duplex electrical connector of claim 6 wherein said two tangs having triangular tips are spaced about 180° apart on the inside periphery of said tubular spring steel retainers.

8. The duplex electrical connector of claim 2 wherein said housing includes a flat portion in said generally oval inbound end and a threaded screw hole in said flat portion for insertion of a screw that contacts said insert thereby retaining said insert in said housing.

9. The duplex electrical connector of claim 8 further including a bushing in said cylindrical outbound end that serves to protect an inserted cable from abrasion.

10. A duplex electrical connector comprising:
   (a) a housing having a cylindrical outbound end, a generally oval inbound end and a smooth internal transition zone between said cylindrical outbound end and said generally oval inbound end;
   (b) a generally oval insert in said generally oval inbound end and comprising a pair of parallel cylindrical apertures having inbound and outbound sides; each of said parallel apertures including a tubular spring steel retainer adapted to receive an armored cable and lock said armored cable into said housing, said tubular spring steel retainers each having a pair of outwardly extending tangs that permit insertion of said tubular spring steel retainer into said aperture by engaging openings in said cylindrical apertures thereby restricting withdrawal of said tubular steel retainer from said aperture, and a set of three inwardly extending tangs to receive and engage an armored cable inserted from said inbound side and restrict its removal room said tubular spring steel retainer, said inwardly extending tangs being oriented to direct an inserted cable toward the center of said housing; and
   (c) a tubular spring steel adapter having outwardly extending tangs and capable of engaging an aperture in an electrical junction box with said tangs, about said cylindrical outbound end and flanges on said cylindrical outbound end to retain said tubular spring steel adapter on said cylindrical outbound end.

* * * * *